(12) United States Patent
Linne

(10) Patent No.: US 10,299,090 B2
(45) Date of Patent: May 21, 2019

(54) FIELD BUS DEVICE FOR DETECTING AN OPERATING STATE OF AN AUTOMATION DEVICE

(71) Applicant: Phoenix Contact GmbH Co. KG, Blomberg (DE)

(72) Inventor: Michael Linne, Detmold (DE)

(73) Assignee: Phoenix Contact GmbH & Co. KG, Blomberg (DE)

(*) Notice: Subject to any disclaimer, the term of this patent is extended or adjusted under 35 U.S.C. 154(b) by 89 days.

(21) Appl. No.: 15/160,514

(22) Filed: May 20, 2016

(65) Prior Publication Data

US 2016/0366535 A1 Dec. 15, 2016

(30) Foreign Application Priority Data

Jun. 15, 2015 (DE) .......... 10 2015 109 482

(51) Int. Cl.
*H04W 4/70* (2018.01)
*H04W 52/02* (2009.01)
*H04W 4/38* (2018.01)

(52) U.S. Cl.
CPC .......... *H04W 4/70* (2018.02); *H04W 4/38* (2018.02); *H04W 52/0229* (2013.01); *Y02D 70/00* (2018.01); *Y02D 70/142* (2018.01); *Y02D 70/144* (2018.01); *Y02D 70/162* (2018.01)

(58) Field of Classification Search
CPC .......... H04W 52/0229; Y02B 60/50
USPC .......... 370/311
See application file for complete search history.

(56) References Cited

U.S. PATENT DOCUMENTS

| 2003/0222822 | A1* | 12/2003 | Kim | H01Q 1/243 343/702 |
| 2006/0046711 | A1* | 3/2006 | Jung | G01D 9/005 455/423 |
| 2010/0145476 | A1* | 6/2010 | Junk | G05B 19/042 700/7 |
| 2012/0079118 | A1* | 3/2012 | Bailey | H04W 4/001 709/227 |
| 2016/0261972 | A1* | 9/2016 | Ozoe | G05B 19/042 |

FOREIGN PATENT DOCUMENTS

WO WO 2015/060291 A1 4/2015

* cited by examiner

Primary Examiner — Stephen J Clawson
(74) Attorney, Agent, or Firm — Holland & Hart LLP

(57) ABSTRACT

A field bus device for detecting an operating state of an automation device includes: a sensor for acquiring sensor data which indicate an operating state of the automation device; a controller configured to generate a signalling information based at least in part on the acquired sensor data; and a wireless communication interface configured to receive a request to transmit the generated signalling information via a wireless communication network and to emit the generated signalling information via the wireless communication network in response to the reception of the request.

19 Claims, 3 Drawing Sheets

FIELD BUS DEVICE FOR DETECTING AN OPERATING STATE OF AN AUTOMATION DEVICE

CROSS-REFERENCE TO RELATED APPLICATION

This application claims priority to German patent application No. 10 2015 109 482.7, entitled "Feldbusgerät zur Erfassung eines Betriebszustandes eines Automatisierungstechnikgerätes", and filed on Jun. 15, 2015 by the assignee of this application, the entire disclosure of which is incorporated by reference for all purposes.

BACKGROUND

The present disclosure relates to a field bus device for detecting an operating state of an automation device and to a communication device for communicating with the field bus device.

An operating state of an automation device is often detected using a field bus device, the field bus device having a sensor for acquiring sensor data which indicate the operating state of the automation device. For example, the field bus device has a sensor for recording an electrical power consumption of the automation device. In this case, the field bus device is often arranged in a secure area, such as a switchgear cabinet.

In this case, access to the acquired sensor data for a user of the field bus device is often provided only by integrating a communication device in a complicated manner in a higher-level bus system connected to the field bus device or by the user entering the secure area in which the field bus device is arranged, as a result of which operational reliability may also be reduced.

SUMMARY

The object of the present disclosure is to provide an efficient and energy-saving concept for detecting an operating state of an automation device.

This object is achieved by means of subject matters having the features according to the independent claims. The figures, the description and the dependent claims relate to advantageous embodiments of the principles and techniques described herein.

According to a first example, the object is achieved by means of a field bus device for detecting an operating state of an automation device, having: a sensor for acquiring sensor data which indicate the operating state of the automation device; a controller which is configured to generate a signalling information on the basis of the acquired sensor data; and a wireless communication interface which is configured to receive a request to transmit the generated signalling information via a wireless communication network and to emit the generated signalling information via the wireless communication network in response to the reception of the request. This achieves the advantage that the operating state of the automation device can be efficiently detected and can be transmitted to a communication device belonging to a user. Furthermore, emitting the generated signalling information in response to the reception of the request makes it possible to achieve the advantage of an energy saving since the generated signalling information is emitted only on request.

The field bus device may be an automation input/output device, such as an I/O device. The field bus device may also have a field bus interface for communicating with a higher-level bus system. For example, the field bus device is a local bus subscriber. The field bus device may also be a power measurement terminal, a condition monitoring device or a device for monitoring the state of the automation device by measuring vibrations and/or the temperature. The automation device may be a machine.

The sensor may comprise a temperature sensor, a vibration sensor and/or a sensor for recording an electrical power consumption. The acquired sensor data may also comprise temperature values, vibration values and/or electrical power consumption values of the automation device. Furthermore, the acquired sensor data can be used to draw conclusions on the operating state of the automation device. For example, a high temperature value may indicate overloading of the automation device.

According to one embodiment, the sensor may be a sensor integrated in the field bus device. According to another embodiment, the sensor may be an external sensor which can be connected to the field bus device. In this case, the field bus device may also have a sensor interface for connecting the sensor to the field bus device.

The controller may be formed by a microcontroller or a processor. The controller may also generate the signalling information continuously or in response to the reception of the request. The signalling information may comprise a characterization of the acquired sensor data. For this purpose, the controller may be configured to extract a sensor value from the acquired sensor data and to compare the extracted sensor value with a threshold value in order to characterize the acquired sensor data. For example, a temperature value included in the acquired sensor data exceeds a predetermined maximum temperature threshold value of the automation device and the controller generates an item of signalling information which comprises an indication of thermal overloading of the automation device.

The wireless communication interface may comprise a transceiver and/or a radio module. The wireless communication interface may also be configured to change over to an energy-saving mode, such as a sleep mode, after emitting the particular signalling information. The wireless communication interface may also be configured for communication according to one or more of the following standards: Bluetooth, in particular Bluetooth 4.0 Low Energy, IEEE 802.15.4, ZigBee or wireless local area network (WLAN). The wireless communication interface may also be configured for communication in the 2.4 GHz ISM band. The controller may also be configured to control a function of the wireless communication interface. For example, the controller executes a Bluetooth stack. The wireless communication network may be a Bluetooth communication network, a ZigBee communication network or a WLAN communication network.

A user or operator of the field bus device can use a communication device to emit the request to transmit the generated signalling information via the wireless communication network to the field bus device. The field bus device can also emit the generated signalling information via the wireless communication network to the communication device in response to the reception of the request. The communication device may also have a display device for displaying the received signalling information. For example, the signalling information and/or the operating state of the automation device are/is displayed to the user in the form of a traffic light display.

In one advantageous embodiment of the field bus device, the signalling information comprises a characterization of the acquired sensor data or comprises the acquired sensor data. This achieves the advantage that the signalling information may comprise an indication of the operating state of the automation device.

In another advantageous embodiment of the field bus device, the controller is also configured to determine a sensor value on the basis of the acquired sensor data and to compare the determined sensor value with a threshold value or a number of threshold values in order to characterize the acquired sensor data. This achieves the advantage that the characterization of the acquired sensor data can be generated efficiently. The threshold values may be predetermined threshold values. The number may also be, for example, 2, 3, 4, 5, 6, 7, 8, 9 or 10. For example, the threshold values represent maximum permitted temperature values, vibration values and/or electrical power consumption values for the automation device.

In another advantageous embodiment of the field bus device, the sensor is a sensor for recording an electrical power consumption of the automation device, a temperature sensor for recording a temperature value of the automation device or a vibration sensor for recording a vibration value of the automation device. This achieves the advantage that the operating state of the automation device can be inferred in a particularly efficient manner from the acquired sensor data.

In another advantageous embodiment of the field bus device, the sensor comprises a sensor for recording an electrical power consumption of the automation device, a temperature sensor for recording a temperature value of the automation device and/or a vibration sensor for recording a vibration value of the automation device.

This achieves the advantage that the operating state of the automation device can be detected more efficiently by using a plurality of different sensors.

In another advantageous embodiment of the field bus device, the wireless communication interface is a Bluetooth communication interface, a ZigBee communication interface or a wireless local area network communication interface. This achieves the advantage that an efficient wireless communication interface can be used. The Bluetooth communication interface can be configured for communication according to a Bluetooth low energy standard, in particular according to the Bluetooth 4.0 Low Energy standard.

In another advantageous embodiment of the field bus device, the wireless communication interface is also configured to receive an identifier via the communication network, and the controller is also configured to set up the communication interface to receive the request to transmit the generated signalling information via the communication network in response to the reception of the identifier. This achieves the advantage that efficient access protection can be provided for the wireless communication interface of the field bus device. The identifier may be a predetermined identifier, for example a predetermined alphanumeric identifier. The identifier may also be stipulated during production of the field bus device.

In another advantageous embodiment of the field bus device, the field bus device is configured with a memory, the controller also being configured to store the generated signalling information in the memory, and the wireless communication interface also being configured to read the stored signalling information from the memory and to emit the signalling information which has been read via the communication network in response to the reception of the request. This achieves the advantage that the generated signalling information can be emitted repeatedly, in particular to a plurality of communication devices.

In another advantageous embodiment of the field bus device, the controller and the wireless communication interface are connected via a serial peripheral interface bus system. This achieves the advantage that a function of the wireless communication interface can be efficiently controlled using the controller.

In another advantageous embodiment of the field bus device, the field bus device is configured with a board on which the controller and the wireless communication interface are arranged. This achieves the advantage that the field bus device can have a particularly compact design. The board may be formed by a circuit board, such as a printed circuit board (PCB).

In another advantageous embodiment of the field bus device, the field bus device also has a housing which accommodates the board. This achieves the advantage that contact protection can be provided for the field bus device.

In another advantageous embodiment of the field bus device, an antenna for the wireless communication interface is also arranged on the board. This achieves the advantage that it is possible to dispense with an aperture in a wall of the housing of the field bus device in order to route out an antenna or an antenna connection interface.

In another advantageous embodiment of the field bus device, the antenna has a meander structure, or the antenna is a ceramic chip antenna. This achieves the advantage that an efficient antenna can be used. The antenna may also be formed by a PCB antenna.

In another advantageous embodiment of the field bus device, the field bus device is configured with a field bus interface which is configured to continuously emit sensor data acquired using the sensor via a further communication network. This achieves the advantage that a controller of the automation device can be efficiently provided with the sensor data. The controller may also be configured to control a function of the field bus interface. The further communication network may also be a local bus communication network.

In another advantageous embodiment of the field bus device, the field bus interface is a local bus interface. This achieves the advantage that the field bus device can be supplied with electrical energy via the field bus interface.

In another advantageous embodiment of the field bus device, the field bus device is a local bus subscriber. This achieves the advantage that the field bus device can be efficiently connected to a controller of the automation device using communication technology.

According to a second aspect of the invention, the object is achieved by means of a communication device for requesting a signalling information from one field bus device of a plurality of field bus devices via a wireless communication network, having: a user interface for selecting the field bus device from the plurality of field bus devices; and a wireless communication interface which is configured to emit a request to transmit the signalling information to the selected field bus device via the wireless communication network and is configured to receive the signalling information from the selected field bus device via the wireless communication network. This achieves the advantage that an efficient communication device for requesting the signalling information from the field bus device according to the invention can be provided.

The communication device may be used to communicate with the field bus device according to the invention. Further features of the communication device directly emerge from the functionality of the field bus device according to the invention.

The communication device may be a mobile telephone, a smartphone, a mobile, a handheld device, a tablet computer or a laptop. The plurality of field bus devices may be a plurality of field bus devices according to the invention. Furthermore, the plurality may be, for example, 2, 3, 4, 5, 6, 7, 8, 9, 10, 15, 20 or 25.

The user interface may have an actuating element, such as a knob, a button, a switch, a rotary knob or a dial, and a display device for displaying an item of information relating to the plurality of field bus devices. The user interface may also be formed by a touch-sensitive screen, such as a touchscreen. The communication device may also be configured to use the wireless communication interface to detect field bus devices in an environment of the communication device. For example, the communication device scans its environment for field bus devices. A list of the detected plurality of field bus devices can also be displayed by means of the user interface and one field bus device of the plurality of field bus devices can be selected by a user of the communication device by means of the user interface.

The wireless communication interface may be configured for communication according to one or more of the following standards: Bluetooth, in particular Bluetooth 4.0 Low Energy, IEEE 802.15.4, ZigBee or wireless local area network (WLAN). The wireless communication interface may also be configured for communication in the 2.4 GHz ISM band. The wireless communication network may be a Bluetooth communication network, a ZigBee communication network or a WLAN communication network.

In one advantageous embodiment of the communication device, the communication device is configured with a display device for graphically displaying the received signalling information. This achieves the advantage that the received signalling information can be displayed to a user of the communication device.

The display device may comprise a luminous element, such as a light-emitting diode, or a screen. The display device may also be configured to display the received signalling information or an item of information which is derived from the signalling information and relates to an operating state of an automation device, which is detected using the selected field bus device, in the form of a traffic light. For example, a green traffic light signals a regular operating state of the automation device, an amber traffic light signals a slight deviation from a regular operating state of the automation device and a red traffic light signals a critical operating state of the automation device. The display device may also be an element of the actuating element. For example, the display device is a display element of a touch-sensitive screen.

BRIEF DESCRIPTION OF THE DRAWINGS

Exemplary embodiments of the principles and techniques of this disclosure are illustrated in the drawings and are described in more detail below.

In the drawings.

DETAILED DESCRIPTION OF THE DRAWINGS

Figure 1:
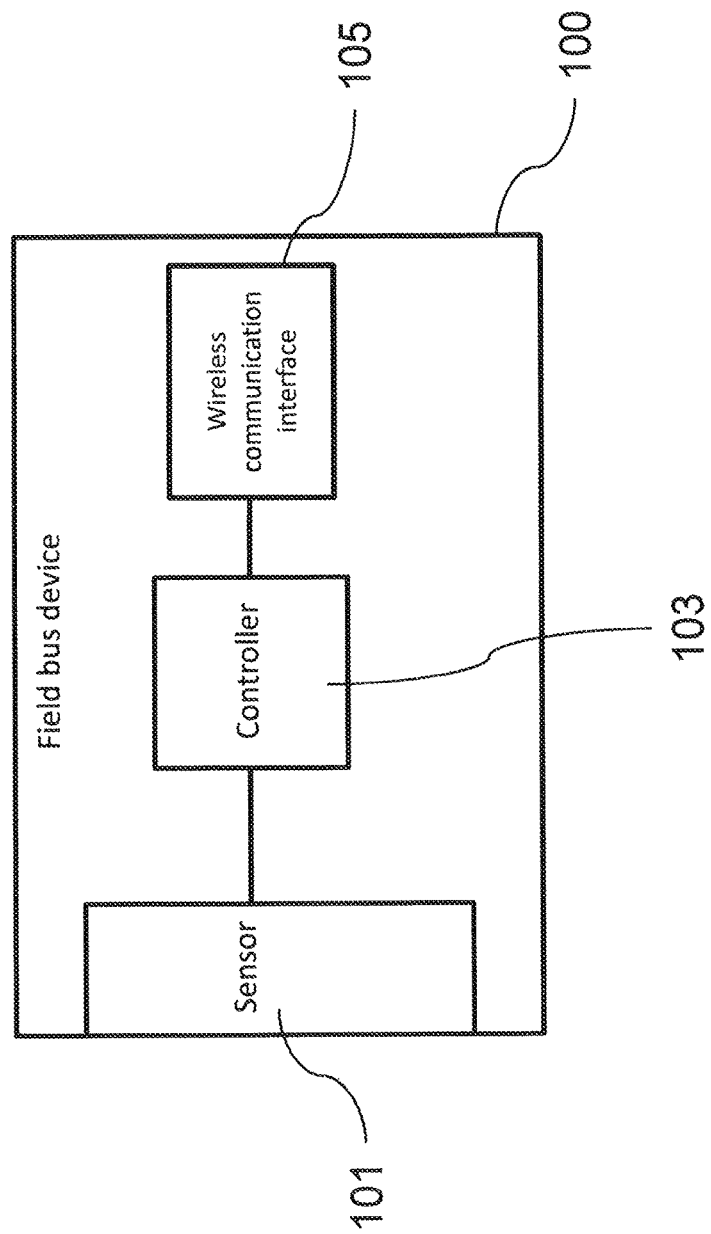
FIG. 1 shows a schematic diagram of a field bus device.

FIG. 1 shows a schematic diagram of a field bus device 100. The field bus device 100 has a sensor 101, a controller 103 and a wireless communication interface 105, the controller 103 being connected to the sensor 101 and to the wireless communication interface 105.

The field bus device 100 for detecting an operating state of an automation device is configured with: the sensor 101 for acquiring sensor data which indicate the operating state of the automation device; the controller 103 which is configured to generate signalling information on the basis of the acquired sensor data; and the wireless communication interface 105 which is configured to receive a request to transmit the generated signalling information via a wireless communication network and to emit the generated signalling information via the wireless communication network in response to the reception of the request. This makes it possible to efficiently detect the operating state of the automation device and to transmit it to a communication device belonging to a user. The advantage of an energy saving can also be achieved by emitting the generated signalling information in response to the reception of the request since the generated signalling information is emitted only on request.

The field bus device 100 may be an automation input/output device, such as an I/O device. The field bus device 100 may also have a field bus interface for communicating with a higher-level bus system. For example, the field bus device 100 is a local bus subscriber. The field bus device 100 may also be a power measurement terminal, a condition monitoring device or a device for monitoring the state of the automation device by measuring vibrations and/or the temperature. The automation device may be a machine.

The sensor 101 may comprise a temperature sensor, a vibration sensor and/or a sensor for recording an electrical power consumption. The acquired sensor data may also comprise temperature values, vibration values and/or electrical power consumption values of the automation device. Furthermore, the acquired sensor data can be used to draw conclusions on the operating state of the automation device. For example, a high temperature value may indicate overloading of the automation device.

According to one embodiment, the sensor 101 may be a sensor integrated in the field bus device 100. According to another embodiment, the sensor 101 may be an external sensor which can be connected to the field bus device 100. In this case, the field bus device 100 may also have a sensor interface for connecting the sensor 101 to the field bus device 100.

The controller 103 may be formed by a microcontroller or a processor. The controller 103 may also generate the signalling information continuously or in response to the reception of the request. The signalling information may comprise a characterization of the acquired sensor data. For this purpose, the controller 103 may be configured to extract a sensor value from the acquired sensor data and to compare the extracted sensor value with a threshold value in order to characterize the acquired sensor data. For example, a temperature value included in the acquired sensor data exceeds a predetermined maximum temperature threshold value of the automation device and the controller 103 generates an item of signalling information which comprises an indication of thermal overloading of the automation device.

The wireless communication interface 105 may comprise a transceiver and/or a radio module. The wireless communication interface 105 may also be configured to change over to an energy-saving mode, such as a sleep mode, after emitting the particular signalling information. The wireless communication interface 105 may also be configured for communication according to one or more of the following standards: Bluetooth, in particular Bluetooth 4.0 Low Energy, IEEE 802.15.4, ZigBee or wireless local area network (WLAN). The wireless communication interface 105 may also be configured for communication in the 2.4 GHz ISM band. The controller 103 may also be configured to control a function of the wireless communication interface 105. For example, the controller 103 executes a Bluetooth stack. The wireless communication network may be a Bluetooth communication network, a ZigBee communication network or a WLAN communication network.

A user or operator of the field bus device 100 can use a communication device to emit the request to transmit the generated signalling information via the wireless communication network to the field bus device 100. The field bus device 100 can also emit the generated signalling information via the wireless communication network to the communication device in response to the reception of the request. The communication device may also have a display device for displaying the received signalling information. For example, the signalling information and/or the operating state of the automation device are/is displayed to the user in the form of a traffic light display.

Figure 2:
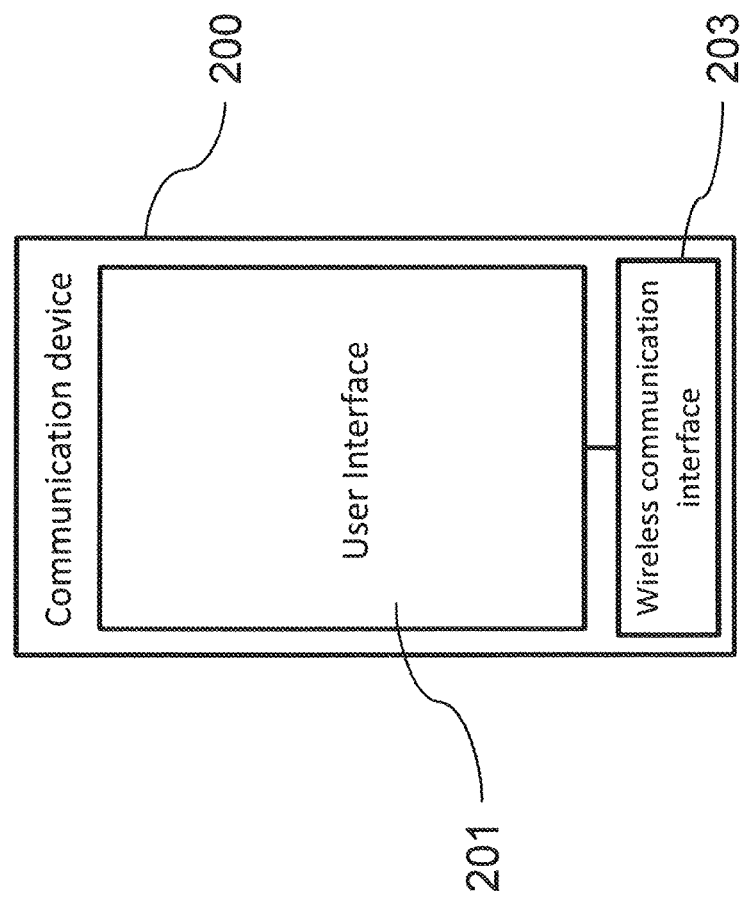
FIG. 2 shows a schematic diagram of a communication device.

FIG. 2 shows a schematic diagram of a communication device 200. The communication device 200 has a user interface 201 and a wireless communication interface 203.

The communication device 200 for requesting a signalling information from one field bus device 100 of a plurality of field bus devices 100 via a wireless communication network is configured with: the user interface 201 for selecting the field bus device 100 from the plurality of field bus devices 100; and the wireless communication interface 203 which is configured to emit a request to transmit the signalling information to the selected field bus device 100 via the wireless communication network and is configured to receive the signalling information from the selected field bus device 100 via the wireless communication network.

The communication device 200 may be a mobile telephone, a smartphone, a mobile, a handheld device, a tablet computer or a laptop. The plurality of field bus devices 100 may be, for example, 2, 3, 4, 5, 6, 7, 8, 9, 10, 15, 20 or 25.

The user interface 201 may have an actuating element, such as a knob, a button, a switch, a rotary knob or a dial, and a display device for displaying an item of information relating to the plurality of field bus devices 100. The user interface 201 may also be formed by a touch-sensitive screen, such as a touchscreen. The communication device 200 may also be configured to use the wireless communication interface 203 to detect field bus devices 100 in an environment of the communication device 200. For example, the communication device 200 scans its environment for field bus devices 100. A list of the detected plurality of field bus devices 100 can also be displayed by means of the user interface 201 and one field bus device 100 of the plurality of field bus devices 100 can be selected by a user of the communication device 200 by means of the user interface 201.

The wireless communication interface 203 may be configured for communication according to one or more of the following standards: Bluetooth, in particular Bluetooth 4.0 Low Energy, IEEE 802.15.4, ZigBee or wireless local area network (WLAN). The wireless communication interface 203 may also be configured for communication in the 2.4 GHz ISM band. The wireless communication network may be a Bluetooth communication network, a ZigBee communication network or a WLAN communication network.

In one advantageous embodiment of the communication device 200, the communication device 200 is configured with a display device for graphically displaying the received signalling information. As a result, the received signalling information can be displayed to a user of the communication device 200.

The display device may comprise a luminous element, such as a light-emitting diode, or a screen. The display device may also be configured to display the received signalling information or an item of information which is derived from the signalling information and relates to an operating state of an automation device, which is detected using the selected field bus device 100, in the form of a traffic light. For example, a green traffic light signals a regular operating state of the automation device, an amber traffic light signals a slight deviation from a regular operating state of the automation device and a red traffic light signals a critical operating state of the automation device. The display device may also be an element of the actuating element 201. For example, the display device is a display element of a touch-sensitive screen.

Figure 3:
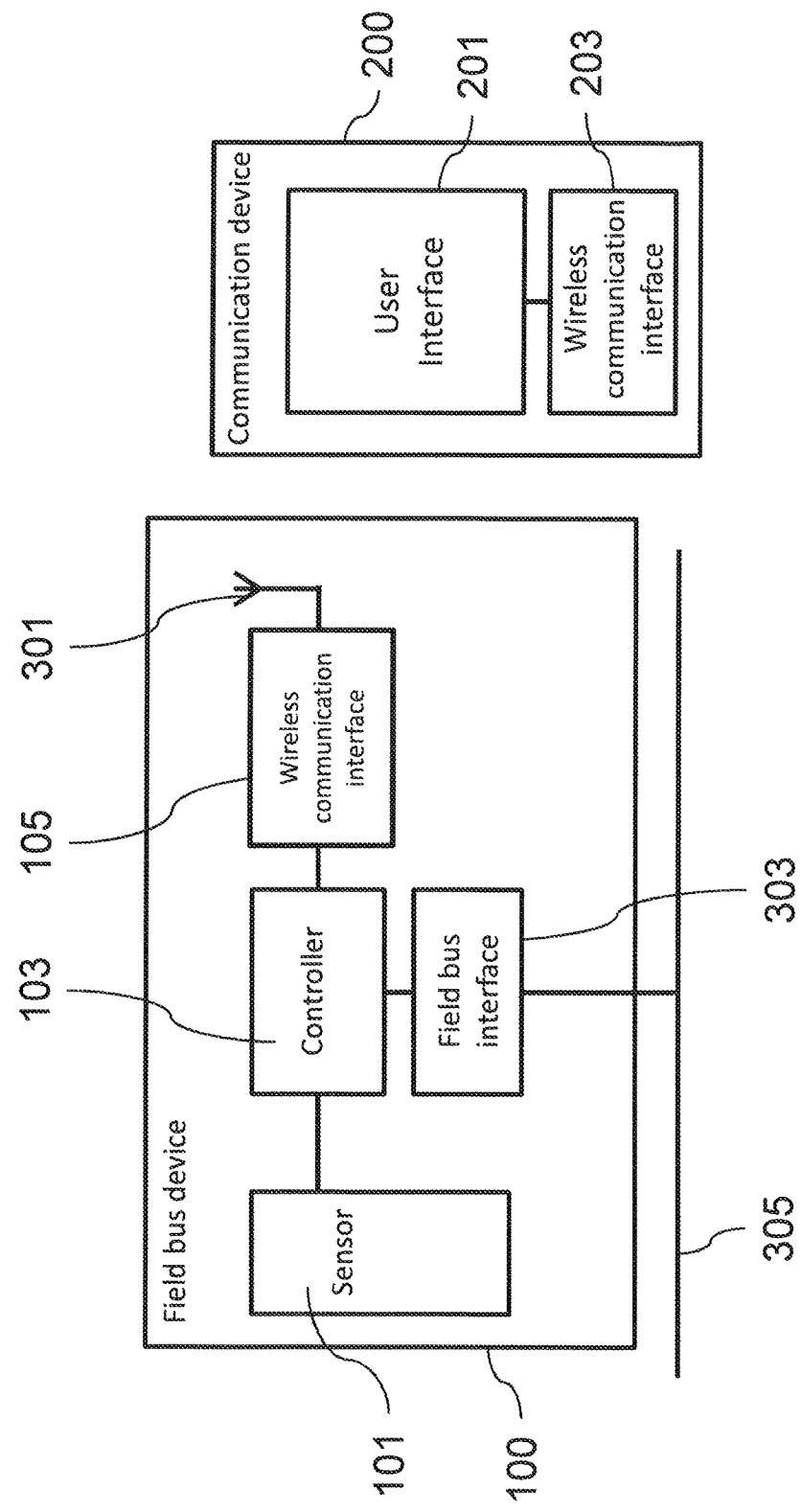
FIG. 3 shows an arrangement having the field bus device and the communication device.

FIG. 3 shows an arrangement having the field bus device 100 and the communication device 200. In this case, the field bus device 100 also has an antenna 301 for the wireless communication interface 105 and a field bus interface 303 for communicating with a field bus communication network 305. For example, the field bus communication network 305 is an inter-bus communication network or a Profinet communication network, the field bus interface 303 being connected to the field bus communication network 305 via a bus coupler (not depicted).

The controller 103 and the wireless communication interface 105 may be connected via a serial peripheral interface (SPI) bus system. The field bus device 100 may also be configured with a board (not depicted) on which the controller 103 and the wireless communication interface 105 are arranged. The board may be formed by a circuit board, such as a printed circuit board (PCB). The field bus device 100 may also have a housing (not depicted) which accommodates the board. The antenna 301 for the wireless communication interface 105 may also be arranged on the board of the field bus device 100. The antenna 301 may also have a meander structure, may be a ceramic chip antenna or may be formed by a PCB antenna.

The field bus interface 303 may be configured to continuously emit sensor data acquired using the sensor 101 via a further communication network. The controller 103 may also be configured to control a function of the field bus interface 303. The further communication network may also be a local bus communication network and the field bus interface 303 may be a local bus interface. The field bus interface 303 may also comprise a field bus protocol chip.

According to one embodiment, the sensor 101 may form a peripheral. According to another embodiment, the wireless communication interface 205 may comprise a 2.4 GHz transceiver, for example for communication according to one of the following standards: Bluetooth or ZigBee.

According to another embodiment, the Bluetooth communication standard is suitable on account of the comparatively long range, particularly for wireless communication with field bus devices 100 or automation devices which are installed in a switchgear cabinet or are difficult to access. For this purpose, a Bluetooth transceiver, in particular a Bluetooth 4.0 Low Energy transceiver, may be integrated in the field bus device 100, such as a field bus I/O device. A controller 103, such as a microcontroller, for controlling or operating the field bus interface 303, for example a field bus protocol chip of the field bus interface 303, may be provided in the field bus device 100, such as an in-line device or Axio line device. A Bluetooth stack for operating the wireless communication interface 105 or the transceiver may also be concomitantly integrated in the firmware of the controller 103.

According to another embodiment, a range of the wireless communication interface 105 of approximately 10 to 50 m can be enabled by using the Bluetooth 4.0 standard. The antenna 301 for the wireless communication interface 105 may also be implemented as a PCB antenna on the board on account of the 2.4 GHz technology used.

According to another embodiment, a status of the field bus device 100, such as an I/O device, and individual process data can be read via the wireless communication interface 105 by pressing a button. In this case, communication can take place between the field bus device 100 and the communication device 200, for example a mobile or a handheld device. A Bluetooth 4.0 interface is already integrated in every modern mobile, for example. Communication can also take place via an app specific to the communication device 200.

According to another embodiment, the field bus device 100 may be a power measurement terminal. In this case, information, for example relating to the power consumption of the automation device or of a machine, can be retrieved by a user or operator from the communication device 200, such as a mobile, independently of the field bus interface 303 or the field bus communication network 305.

According to another embodiment, the field bus device 100 may be a condition monitoring device, for example for monitoring the operating state or monitoring the state of the automation device, such as a machine, by measuring vibrations and the temperature. In this case, the operating state or state of the automation device can be displayed as a traffic light display on the communication device 200, such as a mobile, belonging to the user or operator.

According to another embodiment, in the case of communication between the field bus device 100 and the communication device 200 using the Bluetooth 4.0 standard, it is possible to achieve the advantage that data are transmitted at a low data rate only when required. The wireless communication interface 105, such as a transceiver, may be in a sleep mode for the remaining time and can thereby save energy. The wireless communication interface 105 can therefore form a low energy communication interface. As a result, the field bus device 100 can form a particularly energy-saving device. Such devices and technologies fit well into the future industry 4.0 concept.

According to another embodiment, the wireless communication interface 105, such as a Bluetooth 4.0 transceiver, can be connected to the existing controller 103 in the field bus device 100 via an SPI interface. In this case, the antenna 301 may be in the form of a meander structure on the board. A Bluetooth stack may also be integrated in the controller 103, such as an ARM Cortex microcontroller. According to another embodiment, variants of the field bus device 100 may be produced as an equipment option with and without the wireless communication interface 105.

According to another embodiment, the field bus device 100, such as an I/O device, may be a local bus subscriber, and the wireless communication interface 105 may be configured for communication according to the Bluetooth 4.0 standard. In this case, data are not transmitted continuously but rather only on demand by the user or operator. In power measurement technology in particular, the operator has the possibility of reading data from the field bus device 100 without using the higher-level bus system in the process and without opening a switchgear cabinet door in a secure area.

According to another embodiment, the wireless communication interface 105 may be configured for communication in the 2.4 GHz ISM band. In this case, it is possible to use a radio protocol in line with Bluetooth or IEEE 802.15.4, for example ZigBee. This possibly makes it possible to save on licensing costs.

According to another embodiment, the wireless communication interface 105, such as a 2.4 GHz transceiver, can be connected to the controller 103, such as a microcontroller, via SPI.

According to another embodiment, the antenna 301 can be applied to the PCB as a ceramic chip antenna or a meander structure. As a result, the antenna 301 can be integrated in a housing of the field bus device 100, as a result of which it is possible to dispense with an external antenna on the field bus device 100 or outside the housing of the field bus device 100.

According to another embodiment, the wireless communication interface 105, such as a transceiver, may be configured for communication in the 2.4 GHz band. In this case, the wireless communication interface 105 can support both the IEEE 802.15.4 standard, for example the ZigBee standard, and the Bluetooth standard.

According to another embodiment, the wireless communication interface 105, such as a transceiver, can be connected to the controller 103, such as a microcontroller, via an SPI interface.

According to another embodiment, the antenna 301 can be integrated in the field bus device 100 or a housing of the field bus device 100. For this purpose, the antenna 301 may be designed as a planar antenna with a meander structure on the board or as a ceramic chip antenna.

According to another embodiment, the wireless communication interface 105 may comprise a radio module. This makes it possible to dispense with high hardware qualification costs.

All of the features explained and shown in connection with individual embodiments of the invention can be provided in a different combination in the subject matter according to the invention in order to achieve the advantageous effects thereof at the same time.

LIST OF REFERENCE SYMBOLS

100 Field bus device
101 Sensor
103 Controller
105 Wireless communication interface
200 Communication device
201 User interface
203 Wireless communication interface
301 Antenna
303 Field bus interface
305 Field bus communication network

What is claimed is:

1. A field bus device for detecting an operating state of an automation device, comprising:
   a sensor configured to acquire sensor data indicative of an operating state of the automation device;
   a controller configured to generate a signalling information based at least in part on the acquired sensor data, wherein the controller is configured to generate the signaling information continuously;
   a wireless communication interface configured to receive a request to transmit the generated signalling information via a wireless communication network and to emit the generated signalling information via the wireless communication network in response to the reception of the request; and a field bus interface configured to continuously emit sensor data acquired using the sensor via a different communication network than the wireless communication network.

2. The field bus device according to claim 1, wherein the signalling information comprises at least one member of the group consisting of: a characterization of the acquired sensor data and the acquired sensor data.

3. The field bus device according to claim 1, wherein the sensor is a member of the group consisting of: a power sensor configured to record an electrical power consumption of the automation device, a temperature sensor configured to record a temperature value of the automation device, and a vibration sensor configured to record a vibration value of the automation device.

4. The field bus device according to claim 1, wherein the wireless communication interface is a member of the group consisting of: a Bluetooth communication interface, a ZigBee communication interface, and a wireless local area network communication interface.

5. The field bus device according to claim 1, wherein the wireless communication interface is further configured to receive an identifier via the communication network, and the controller is further configured to, in response to the reception of the identifier, set up the communication interface to receive the request to transmit the generated signalling information via the communication network.

6. The field bus device according to claim 1, further comprising a memory, wherein the controller is further configured to store the generated signalling information in the memory, and the wireless communication interface is further configured to read the stored signalling information from the memory and to emit the signalling information which has been read via the communication network in response to the reception of the request.

7. The field bus device according to claim 1, wherein the controller and the wireless communication interface are connected via a serial peripheral interface bus system.

8. The field bus device according to claim 1, further comprising a board on which the controller and the wireless communication interface are arranged.

9. The field bus device according to claim 8, wherein an antenna for the wireless communication interface is arranged on the board.

10. The field bus device according to claim 9, wherein the antenna comprises a meander structure, or wherein the antenna comprises a ceramic chip antenna.

11. The field bus device according to claim 1, wherein the field bus interface comprises a local bus interface.

12. The field bus device according to claim 1, wherein the field bus device comprises a local bus subscriber.

13. A communication system for requesting a signalling information from one field bus device of a plurality of field bus devices via a wireless communication network, comprising:

a user interface configured to select the field bus device from the plurality of field bus devices;

a wireless communication interface configured to emit a request for the signalling information to the selected field bus device via the wireless communication network and is configured to receive the signalling information from the selected field bus device via the wireless communication network; and the field bus device further comprising a field bus interface configured to continuously emit sensor data acquired using the sensor via a different communication network than the wireless communication network to an automation device.

14. The communication system according to claim 13, further comprising a display device for graphically displaying the received signalling information.

15. A method of detecting an operating state of an automation device, comprising:

acquiring sensor data indicative of an operating state of the automation device;

generating signalling information based at least in part on the acquired sensor data, wherein the signaling information is generated continuously;

receiving a request over a wireless communication interface to transmit the generated signalling information via wireless communication network;

emitting the generated signalling information via the wireless communication network in response to the reception of the request; and emitting the acquired sensor data via a different communication network than the wireless communication network, wherein the acquired sensor data is emitted continuously.

16. The method of claim 15, wherein the signalling information comprises at least one member of the group consisting of: a characterization of the acquired sensor data and the acquired sensor data.

17. The method of claim 15, further comprising:

receiving an identifier via the communication network; and setting up, in response to the reception of the identifier, the communication interface to receive the request to transmit the generated signalling information via the communication network.

18. The method of claim 15, further comprising:

storing the generated signalling information in a memory;

read the stored signalling information from the memory; and emit the signalling information which has been read via the communication network in response to the received request.

19. The method of claim 15, further comprising:

continuously emitting sensor data acquired using the sensor to a controller of the automation device.

* * * * *